Patented Dec. 12, 1944

2,364,882

UNITED STATES PATENT OFFICE 2,364,882

METHOD FOR PURIFYING AQUEOUS ALKALI METAL HYDROXIDES

Gardner W. Vose, Painesville, Ohio, assignor to Diamond Alkali Company, Pittsburgh, Pa., a corporation of Delaware No Drawing. Application June 4, 1943, Serial No. 489,718

8 Claims. (Cl. 23—184)

This invention relates to the art of preparing alkali metal hydroxides and is particularly concerned with a new and improved method for purifying aqueous solutions of such material.

Caustic soda is prepared commercially either by electrolysis of aqueous sodium chloride or by causticization of soda ash. Depending upon the method employed, the raw materials used, the composition and temperature of vessels contacting the material during the process, and other factors, the amounts and kinds of substances contaminating the resulting caustic soda will vary considerably. These substances include iron, silica and alumina. Since the presence of even a small amount of these impurities, particularly iron, is objectionable or intolerable in caustic soda for certain uses, such as in the rayon industry, a demand for a high purity product has existed for some time. To meet this demand many processes have been proposed for purification of caustic soda but, so far as I am aware, the products of all those processes contain appreciable amounts of the impurities.

I have devised a new and improved process by which caustic soda may be freed from substantially all contaminating solids, particularly alumina, silica and iron.

Briefly, the present invention comprises the steps of adding a solution of nickel salt to an aqueous alkali metal hydroxide, stagnating the resulting mixture, and separating substantially all the insoluble material from said aqueous hydroxide.

The following examples are furnished as specific illustrations of the present invention but it is to be understood that they are illustrative and not limiting:

Example 1

To a 23% solution of caustic soda having a temperature of about 130° F. and containing iron equivalent to 0.00092% $Fe_2O_3$ was added an aqueous 2% solution of nickel sulfate ($NiSO_4$) until the solution undergoing treatment contained 0.1% of the nickel salt on the basis of the caustic soda. After thorough agitation and an hour of stagnation, during which period the temperature was maintained at approximately 130° F., the mixture was filtered. Upon analysis it was found that the solution contained iron equivalent to 0.00002% $Fe_2O_3$.

Example 2

To a 50% solution of caustic soda having a temperature of 105° F. and containing iron equivalent to 0.00267% $Fe_2O_3$ was added an aqueous 10% solution of nickel sulfate ($NiSO_4$) until the solution undergoing treatment contained 0.5% of the nickel salt on the basis of the caustic soda. After thorough agitation and 3 hours of stagnation at a temperature of 100° F. to 105° F. the mixture was filtered. Upon analysis it was found that the solution contained iron equivalent to 0.00023% $Fe_2O_3$.

In this specification, in the examples and in the appended claims only weight basis percentages are specified.

In practicing this invention I prefer to treat solutions containing not in excess of about 25% of caustic soda. Those containing between about 25% and about 50% or more of caustic soda can also be purified by this process; but due to the greater density and attending lesser settling rate of solids, more difficulty is experienced in separating the solid and liquid phases. More dilute solutions, that is, solutions containing less than about 20% of caustic soda can be treated according to this process and substantial iron removal effected despite the fact that in such solutions iron ordinarily exists as a dissolved salt, probably sodium ferrite. Treatment of very dilute solutions is also feasible if they are not to be concentrated, or, if there is little likelihood of iron contamination occurring during concentration.

I have found that this process is operable regardless of the temperature of the solution undergoing treatment so long as no solid caustic soda is present. Since, according to the customary procedure in the manufacture of caustic soda, the freshly prepared electrolytic or chemical sodium hydroxide is concentrated by evaporation in iron vessels, treated for removal of iron and then further concentrated by evaporation in nickel-lined equipment, it is preferable to treat the hot solution as it is drawn from the iron vessels and to carry out the second evaporation with the still warm solution. Thus, economy of time and of heat energy is effected. In practicing the present invention, therefore, I prefer to treat solutions of about 25% caustic soda coming from the iron vessels at a temperature of 110° F. to 130° F. in which range the process is quite effective.

Any nickel salt, or mixture of nickel salts, readily soluble in water is suitable for use in this process. I prefer to use nickel sulfate, however, for contamination of the treated solution with sodium sulfate formed during the reaction between nickel sulfate and caustic soda is not serious. Nickel chloride and nitrate are not preferred because the resulting sodium chloride and sodium nitrate, even though small in amounts, are objectionable impurities.

Removal of iron and other suspended solids from caustic soda solutions is accomplished through this process but I am unable to state with any degree of certainty that the phenomenon attending said removal is chemical, physical, or a combination thereof. I am certain, however, that upon addition of aqueous nickel sulfate a chemical reaction takes place in the caustic soda solution according to the following expression.

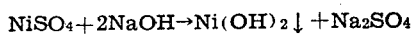

$$NiSO_4 + 2NaOH \rightarrow Ni(OH)_2 \downarrow + Na_2SO_4$$

where $NiSO_4$ is nickelous sulfate, $NaOH$ is caustic soda, $Ni(OH)_2$ is nickelous hydroxide and $Na_2SO_4$ is sodium sulfate.

The nickel hydroxide is insoluble and, as the downward directed arrow indicates, it settles from the solution. Apparently the iron and other suspended impurities are removed from the solution by absorption and/or occlusion by the precipitated nickel hydroxide.

The tendency is very strong for nickelous hydroxide thus formed to be oxidized by the air associated with the treated solution and there is little likelihood of any nickelous hydroxide existing in said solution. The effect is the same with either hydroxide, however, as both are insoluble in the caustic soda and can be separated from the solution in the same manner.

Concentrations and amounts of nickel sulfate preferred for use in the present process vary over a broad range and in any given case are controlled by the concentration and quantity of the solution undergoing treatment. To elaborate, if a 25% solution of sodium hydroxide is being treated, best results can be obtained thru the use of a 2% solution of the nickel salt, or, if the solution is about 50% caustic soda, best results can be obtained with a 10% solution of said salt. Similarly, if the caustic soda solution is of about 25% strength, a total of about $\frac{1}{10}$% of nickel sulfate on the basis of the weight of caustic soda in said solution is ordinarily sufficient to accomplish removal of more than 90% of the iron. Solutions having a concentration greater than 50% or less than 25% or between about 25% and about 50% are preferably treated with an amount and concentration of aqueous nickel sulfate corresponding to the caustic soda concentration, the foregoing prescribed concentrations and quantities serving as the basis for determining the proper values in any particular case.

Following the addition of the nickel salt, the mixture is agitated in order to accomplish, as nearly as possible, thorough and intimate mixture of the two solutions and uniform dispersion of precipitated nickel hydroxide. It is to be understood that satisfactory results can be obtained without agitation of the mixture, but that such treatment necessitates the use of considerably more aqueous nickel salt and additional time and the results are often inconsistent and are usually unpredictable. Following the agitation, which may be continued for ten minutes or longer, depending upon the method employed and the concentration and quantity of solution treated, the mixture is stagnated while the precipitated nickel hydroxide and other solids are settled. The length of the settling period is determined by the density of the caustic soda solution and other factors but with a 25% solution substantial separation can usually be accomplished within 1 to 2 hours. With more concentrated solutions the time required will be greater, but even with 50% caustic soda 2 to 3 hours is usually adequate. In commercial operation where filtration is taking place continuously and the level of the mixture within the filtration vessel is maintained nearly constant, as by the continuous addition of fresh mixture, the mixture is effectively stagnated altho actual, absolute stagnation, which would probably be realized in batch filtration, may not be realized.

Inasmuch as nickel salts are expensive and sometimes are difficult to secure, it is desirable that means for recovering those used in this process be provided. It is my preference to treat the solids containing the nickel compounds with dilute sulfuric acid or any other suitable mineral acid. By keeping the resulting solution only slightly acid, the iron will not be dissolved while the nickel will be dissolved and can be extracted in reasonably pure form. From the foregoing description it will be apparent that sulfuric acid is to be preferred in effecting this recovery if the recovered nickel salt is to be reused in this process.

In this specification the word "about" has been used to mean variations of less than 10% from times, percentages and the like. The word "about" has, however, not been included in the claims because of the familiar rule that some small departure from definite times, amounts and percentages in the claims is always allowed.

Having thus described the present invention so that others skilled in the art may be able to understand and practice the same, I state that what I desire to secure by Letters Patent is defined in what is claimed.

What is claimed is:

1. The method of purifying an aqueous solution containing between 10% and 50% of sodium hydroxide which comprises the steps of providing an aqueous solution containing between 1% and 10% of nickel sulfate depending on the concentration of the caustic solution, adding to the said caustic solution an amount of the nickel sulfate solution containing nickel sulfate equivalent to between .1% and .5% of the caustic soda, agitating the resulting mixture, stagnating said mixture for between one hour and three hours, and separating substantially all the solids from said mixture.

2. The method of purifying an aqueous solution containing between 10% and 60% of sodium hydroxide which comprises the steps of providing such a solution at a temperature of between 90° F. and 130° F., providing an aqueous solution containing between 1% and 10% of nickel sulfate depending on the concentration of the caustic solution, adding to the said caustic solution an amount of the nickel sulfate solution containing nickel sulfate equivalent to between .1% and .5% of the caustic soda, agitating the resulting mixture, stagnating said mixture for between one hour and three hours, and separating substantially all the solids from said mixture.

3. The process of purifying aqueous alkali metal hydroxide which comprises the steps of adding to such hydroxide such a quantity of a 1% to 10% nickel salt solution as will contain an amount of the nickel salt equivalent to between .1% and .5% of the hydroxide, stagnating the mixture, and then separating substantially all insolubles from said hydroxide.

4. The process of purifying aqueous alkali metal hydroxide which comprises the steps of adding to such hydroxide such a quantity of a 1% to 10% aqueous nickel salt solution as will contain an amount of the nickel equivalent to between .1% and .5% of the hydroxide, stagnating the mixture, and then separating substantially all insolubles from said hydroxide.

5. The process of purifying aqueous alkali metal hydroxide which comprises the steps of adding to such hydroxide such a quantity of a 1% to 10% of an aqueous nickel sulfate solution as will contain an amount of the nickel sulfate equivalent to between .1% and .5% of the hydroxide, stagnating the mixture, and then separating substantially all insolubles from said hydroxide.

6. The process of purifying an aqueous solution of sodium hydroxide which comprises the steps of adding to such hydroxide such a quantity of a 1% to 10% aqueous nickel sulfate solution as will contain an amount of the nickel sulfate equivalent to between .1% and .5% of the hydroxide, the quantity and concentration of the sulfate solution varying with the concentration of the hydroxide solution, stagnating the mixture, and then separating substantially all insolubles from said hydroxide.

7. The process of purifying an aqueous solution containing less than about 25% of sodium hydroxide which comprises the steps of adding to such hydroxide such a quantity of a 2% aqueous nickel sulfate solution as will contain an amount of nickel sulfate equivalent to .1% of the hydroxide, stagnating the mixture, and then separating substantially all insolubles from said hydroxide.

8. The process of purifying an aqueous solution containing about 50% of sodium hydroxide which comprises the steps of adding to such hydroxide such a quantity of a 10% aqueous nickel sulfate solution as will contain an amount of nickel sulfate equivalent to .5% of the hydroxide, stagnating the mixture, and then separating substantially all insolubles from said hydroxide.

GARDNER W. VOSE.